United States Patent

O'Keefe

[15] 3,706,970

[45] Dec. 19, 1972

[54] HEAD-UP ATTITUDE DISPLAY
[72] Inventor: William J. O'Keefe, Dedham, Mass.
[73] Assignee: The United States of America as represented by the Administrator of the National Aeronautics and Space Administration
[22] Filed: May 12, 1970
[21] Appl. No.: 36,534

[52] U.S. Cl. ............................................ 340/27 AT
[51] Int. Cl. ................................................ G08g 5/00
[58] Field of Search ....... 340/27 AT, 27 R, 27 SS, 26, 340/28; 33/204 C

[56] References Cited

UNITED STATES PATENTS

| 3,085,429 | 4/1963 | Majendie | 340/27 R |
| 3,589,019 | 6/1971 | Culver | 33/204 C |
| 3,282,242 | 11/1966 | Wrestler, Jr. | 33/204 C |

Primary Examiner—Kathleen H. Claffy
Assistant Examiner—Thomas L. Kundert
Attorney—John R. Manning, Howard J. Osborn and William H. King

[57] ABSTRACT

An aircraft instrument providing a head-up attitude display. The instrument provides a pitch and roll attitude reference coincident with the true horizon in a pilot's actual field of view through a cockpit windscreen. The principal indicator is a movable, horizontal baton which is driven from a standard gyroscopic attitude reference. The baton has two degrees of freedom, one up and down in the vertical plane for pitch attitude changes and a tilting movement for roll attitude changes. With the two degrees of freedom and the baton positioned immediately adjacent the windscreen, an artificial horizon is provided in the direct field of view of the pilot with all the advantages of peripheral vision inherent in a head-up system. The batons are illuminated to accentuate the image of the batons in the peripheral vision of the pilot.

2 Claims, 11 Drawing Figures

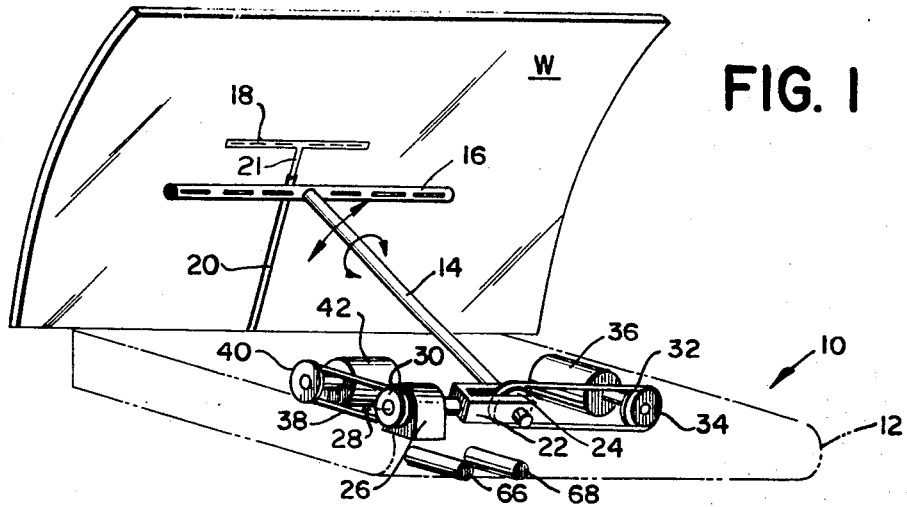
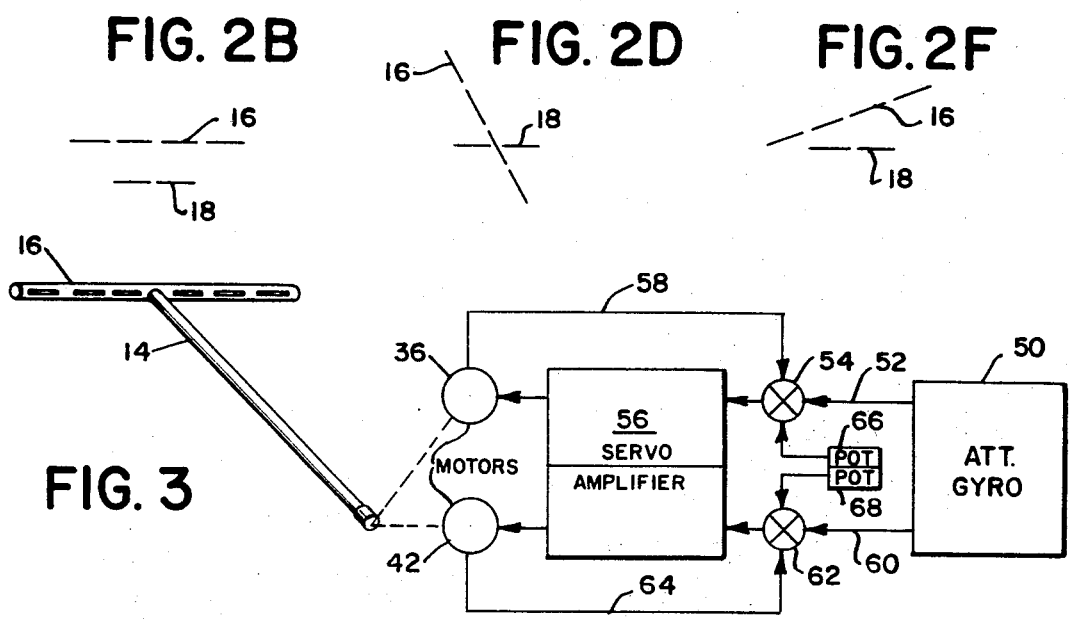
INVENTOR
WILLIAM J. O'KEEFE
BY Herbert F. Garner
ATTORNEY

PATENTED DEC 19 1972

HEAD-UP ATTITUDE DISPLAY

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

This invention relates to the field of aircraft instrumentation. More specifically, the present invention is directed to an artificial horizon instrument which provides a head-up attitude display in the pilot's field of view from the cockpit through the windscreen. Accordingly, the general objects of the present invention are to provide novel and improved articles and methods of such character.

2. Description of the Prior Art

The field of aircraft instrumentation has developed almost simultaneously with the development of flight control systems. Instruments which provide flight information to the pilot include attitude reference information as a basic element and artificial horizon instruments are commonplace on the instrument panels of many aircraft.

More recently, efforts have been directed toward head-up displays which can be interposed in the pilot's field of view through the windscreen of the aircraft. While artificial horizon instruments on the instrument panel are considered valuable instrument aids, which instruments do require that the pilot's line of sight be directed downwardly to the instrument panel; and, in this position, peripheral references in the environment surrounding the aircraft may be lost. In the head-down position, the pilot is generally 100 percent dependent upon his instruments and as a consequence, any instrument error or failure may create a dangerous situation. In addition, since reference to instruments is generally employed in conditions of low visibility immediately prior to touch-down, the pilot is forced to continuously focus his eyes between virtually infinitely distant objects and the instrument panel in order to pick up visual contact with the ground as soon as conditions permit. A transition time is associated with one's eyes focussing and refocussing between the close and distant reference sources. The delay associated with the transition is not desirable particularly in the critical period prior to landing an aircraft.

Because of the above-referenced factors associated with panel mounted instruments, there is great interest in head-up displays in which flight information is presented in the actual field of view of the pilot through the windscreen. The concept of such displays utilizes peripheral vision input from the region surrounding the displayed information without direct observation to provide continuous attitude rate information to the pilot at a time when he is performing other functions germane to controlling the vehicle. The delay associated with transition time may be alleviated by superimposing a head-up artificial horizon over the actual horizon. Such a head-up display would not require any change in technique in deriving attitude information since the actual and artificial horizons would be in the same relative locations and would respond visually to changes in aircraft attitude in the same way.

In spite of the development of many types of head-up displays that present artificial horizon information, as well as other information, they have almost universally been based on image splitting screens that partially reflect an image of the horizon in such a manner as to superimpose this image on the real, or visual, horizon. These systems usually employ a CRT (cathode ray tube) or a prismatically projected image that requires focus at infinity as well as a collimation lens system to render an acceptable image. This equipment is very expensive and intricate. These systems use an attitude reference source as the principal component since the primary purpose of the head-up display is aircraft control in reduced visibility.

It is accordingly an object of this invention to provide an artificial horizon head-up indicator for all conditions of visibility.

It is a further object of the invention to provide an artificial horizon indicator that coincides with the real, or actual, horizon when visible.

It is a further object of the invention to enhance collision avoidance by allowing the pilot to keep his eyes focussed outside the aircraft.

It is a further object of the invention to permit peripheral vision information on attitude rate to be available to the pilot at all times.

It is still a further object of the invention to reduce the transition time between flying an aircraft with an outside reference and flying the aircraft with an instrument reference.

It is still a further object of the invention to illuminate an horizon indicator to extend its usefulness to night or low light level conditions.

SUMMARY OF THE INVENTION

The head-up artificial horizon instrument uses as its primary indicator a baton which is positioned in the field of view of the pilot and coincident with the real horizon. The baton is supported from the end of a shaft which is mounted in an instrument fixture. The fixture together with the shaft and baton is positioned in the aircraft so that the baton is held in a horizontal position at the end of the shaft. In order to maintain the baton in the true horizontal position, the shaft supporting the baton extends at an angle from the vertical and is rotated in synchronism with rolling motions of the aircraft. The rotation of the shaft is controlled by motors within the fixture and the motors are in turn controlled by signals derived from an attitude gyro mounted within the aircraft.

The baton is also moved vertically within the field of view of the pilot by means of a second motor in the fixture which causes the shaft to pivot in a longitudinal plane of the aircraft. The pivoting motion of the shaft by the second motor is accomplished in response to pitching motions of the aircraft which are also detected by the attitude gyro. The baton, therefore, is held parallel to the true horizon by rotating the shaft and follows the position of the true horizon in the field of view of the pilot by moving up and down in the longitudinal plane through pivotal motions of the shaft.

A second baton representing the aircraft attitude is suitably fixed in the aircraft at a position adjacent to the movable baton. The pilot can readily compare the aircraft attitude represented by the fixed baton with that of the true horizon represented by the movable baton. Since the movable baton generally follows the motions of the true horizon in the field of view of the pilot, the pilot can maintain visual contact with features outside the aircraft without losing his artificial horizon reference. If the true horizon is temporarily obscured by clouds or smoke, the pilot simply refers to his artificial horizon reference and may immediately pick up the true horizon when land features again come into his field of vision.

BRIEF DESCRIPTION OF THE DRAWINGS:

The artificial horizon instrument and its numerous advantages may be better understood by reference to the following drawings wherein like elements bear like reference numerals throughout the several figures.

FIG. 1 is an orthogonal view of the artificial horizon instrument located in front of an aircraft windscreen.

FIG. 2 depicts the images presented by the artificial horizon instrument in various flight conditions.

FIG. 3 is a block diagram of the control mechanism which operates the artificial horizon reference.

Figure 4:
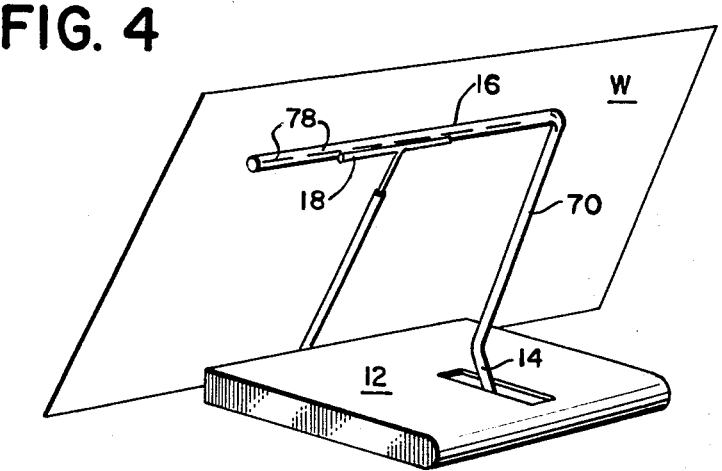
FIG. 4 is an abbreviated view of an alternate embodiment of the artificial horizon located before a windscreen.

DESCRIPTION OF THE PREFERRED EMBODIMENTS:

With reference now to FIG. 1, the novel head-up artificial horizon instrument of the present invention is generally designated at 10 installed in an aircraft cockpit on top of the instrument panel combining its control elements with its display elements in front of a windscreen W. The basic components of the display portion of their instrument include a fixture 12, a support shaft 14, an artificial horizon reference baton 16 and an aircraft reference baton 18. As indicated by the arrows, the shaft 14 can be rotated about its own axis and also pivoted or tilted with respect to the fixture 12 about an axis 28 which lies generally normal to a longitudinal plane of the aircraft. The baton 16 is rigidly mounted to the projecting end of shaft 14 and, therefore, moves with the rotational and pivotal motions of the shaft 14.

As noted above, the baton 16 is raised or lowered by means of the pivoting motion of shaft 14 about axis 28. Baton 16 can also be positioned at an angle or tilted by rotating the shaft 14. Interposed between the windscreen W and the baton 16 is the aircraft reference baton 18. The baton 18 is mounted on a slidable support rod 21 in a support tube 20 which projects from the fixture 12. The baton 18 may be held stationary within the tube 20 by a thumbscrew (not shown) in tube 20. The baton 18 represents the attitude of the aircraft when compared to the movable baton 16.

As described in greater detail hereinafter, the baton 16 is placed at an angle to the fixed baton 18 in response to rolling motions of the aircraft and is translated vertically with respect to the baton 18 in response to pitching motions of the aircraft. Each of the batons is located near the windscreen W in the field of view of a pilot controlling the aircraft. Accordingly, the image of the two batons with respect to one another provides a novel head-up artificial horizon reference.

FIG. 2 discloses several attitude display images presented by the superimposed batons for different flight conditions. In FIG. 2a, the baton 16, being longer than the fixed baton 18, obscures or completely overlaps the fixed baton in the condition of straight and level flight. In FIG. 2b, the baton 16 is displaced upwardly above the baton 18 as would the true horizon during a nose down attitude of the aircraft. In FIGS. 2c and 2d, the baton 16 is at an angle to the baton 18. In each case the image indicates that the aircraft is making a left-hand turn. In FIG. 2d, however, the angle is somewhat greater to represent a tighter left-hand turn than that represented by the image of FIG. 2c and the aircraft is in a nose down attitude since the center of baton 18 is below the center of baton 16. The images of FIGS. 2e and 2f represent the aircraft in a right-hand turn. In FIG. 2e, the baton 16 representing the horizon is below the fixed baton 18 while in FIG. 2f the positions are reversed. As a consequence FIG. 2e represents a climbing right-hand turn and, conversely, FIG. 2f represents a descending right-hand turn.

Referring again to FIG. 1, the mechanical apparatus which provides the pivotal and rotational motions of shaft 14 is seen in detail. The lower end of the shaft 14 adjacent to the fixture 12 is rotatably mounted in the forks of a yoke 22. If desired, the rotation of the shaft 14 in the yoke 22 may be facilitated by providing friction bearings on the shaft. Interposed between the forks and fixedly secured to the shaft 14 is a pulley wheel 24. The axial length of the pulley wheel 24 at its hub is substantially equal to the spacing between the forks of yoke 22 so that the shaft 14 will not translate axially to any significant extent. The shaft 14 therefore is only free to rotate with respect to yoke 22.

The shaft extension of yoke 22, in turn, is pivotally mounted in a bearing block 26. Yoke 22 is thus rotatable about the axis 28 which extends generally transverse of the aircraft. A pulley wheel 30 is fixed to the end of the yoke 22 opposite the forks. By means of the pulley wheel 30 and a suitable spacer (not shown), the yoke 22 can be rotated in block 26 but is not allowed to shift laterally in the aircraft. It will be understood that rotation of pulley 24 cause the baton 16 to be tilted or angled with respect to the baton 18 and rotation of the pulley wheel 30 causes the baton 16 to be translated vertically with respect to the baton 18. From these two degrees of freedom of the baton 16, the various attitude display images are formed.

Connected to the pulley wheel 24 is a drive belt 32. A pulley wheel 34 on a roll motor 36 drives the wheel 24 through the belt 32. The pulley wheel 34 is positioned along the lateral axis 28 in a plane which is angled with respect to the plane of pulley wheel 24 as a function of the pivotal position of shaft 14. The drive belt 32 forms a loop between the two wheels 24 and 34 and allows a direct drive to be maintained between the roll motor 36 and the rotatable shaft 14 while the shaft 14 is pivoted with yoke 22 in the fixture 12. The pivoting motion of the shaft 14 with respect to the fixture 12 is accomplished by means of the drive belt 38, pulley wheel 40 and pitch motor 42. Both motors 36 and 42 are small servo motors with feedback potentiometers that allow the motors to be rotated an amount directly proportional to the energizing voltage.

The drive connection between roll motor 36 and shaft 14 permits the baton 16 to be angled with respect to the baton 18 and the drive connection between pitch motor 42 and shaft 14 permits the baton 16 to be translated vertically with respect to the baton 18. Accordingly, control voltages applied to the roll motor 36 tilt the baton 16 with respect to baton 18 and voltages applied to the pitch motor 42 vertically displace baton 16 with respect to baton 18.

Reference to FIG. 3 discloses a block diagram of the control system which drives the motors 36 and 42. The control system is shown diagramatically along with the mechanical connections from the motors 36 and 42 to the shaft 14.

The principal reference instrument from which the control signals are derived is a standard attitude gyro 50. The gyro 50 is a vertical gyro which provides both pitch and roll attitude signals at different pickoffs of its gimbal system. The roll signal is transmitted by conductor 52 to a summing network 54. The control signal is then transmitted to one channel of a dual channel servo amplifier 56 in which a drive voltage is produced and transmitted to roll motor 36. A negative feedback signal from motor 36 is transmitted by conductor 58 to the summing network 54 where it is compared with the attitude signal from the gyro 50. The servo amplifier has an adjustable gain so that the amplitude and rate of baton displacement can be adjusted for different aircraft as a function of the distance between the pilot and the baton 16. Greater separation between pilot and baton requires greater displacement of the baton 16 to keep the baton 16 coincident with the real horizon.

In a similar manner, the pitch signal from tyro 50 is transmitted by conductor 60 to summing network 62. The control signal is then transmitted to the other channel of the servo amplifier 56 in which a drive voltage is generated and applied to pitch motor 42. A negative feedback signal from the motor 42 is transmitted by means of conductor 64 to the summing network 62.

The signals from amplifier 56 cause the baton 16 to follow the movements of the real horizon with respect to the aircraft. The deviations of the aircraft from a known reference attitude are directed by the gyro 50 and cause the baton 16 to either tilt or translate or both to provide the appropriate image for the detected aircraft attitude. With appropriate amplifier gains, baton 16 remains coincident with the true horizon.

Since the intent of the present invention is to provide an artificial horizon instrument which is located in the field of view of the pilot, it is desirable to adjust the batons 16 and 18 to provide the superimposed images such as shown in FIG. 2a for straight and level flight and to superimpose baton 16 directly on the true horizon. Pilots of differing stature may wish to reposition the batons slightly with respect to one another to correctly superimpose the images. For this purpose, trimpots 66 and 68, which introduce electrical biases, are connected respectively to the roll and pitch channels of the instrument at the summing networks 54 and 62, respectively. As seen in FIG. 1, the trimpots are mounted in the fixture 12 at a convenient location in the cockpit for the pilots to adjust the horizon baton 16 with respect to the true horizon prior to or during flight. After the baton 16 has been positioned coincidentally with the true horizon, the baton 18 is adjusted in tube 20 so that the two batons are superimposed in straight and level flight.

Reference to FIG. 4 discloses a modified form of the artificial horizon instrument. The baton 16 is supported from the end of the shaft 14 which is modified by means of an angled arm 70 extending between the projecting end of shaft 14 and one lateral end of the baton 16. With such a construction, it is possible to locate the baton 16 between the windscreen W and the fixed baton 18. The movable baton 16 is, therefore, behind the aircraft baton 18 and approximates the standard positional relationship of the aircraft and horizon references of other such instruments. Generally, however, the embodiment disclosed in Fig. 1 is preferred due to the higher structural rigidity and the absence of interference between the baton supports which allows greater operational ranges.

Figure 5:
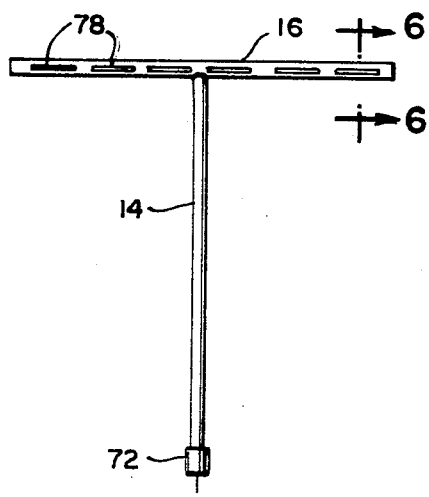
FIG. 5 is a detailed view of the horizon reference baton which can be illuminated.
Figure 6:
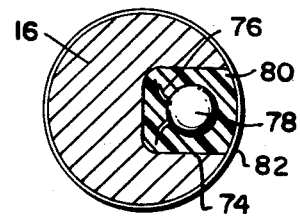
FIG. 6 is a cross-sectional view of the illuminated baton as seen along the section line 6—6 of FIG. 5.

The baton employed in either embodiment may also be illuminated for night or low light level operations. FIGS. 5 and 6 disclose details of the movable baton 16 which has been modified for illumination. Power for the lights is introduced through a coaxial connector 72 at the base of the shaft 14. Wires (not shown) are fed up through the hollow shaft 14 to the baton 16 which is an aluminum or opaque plastic rod. The side of the rod which faces the pilot contains a groove 74 that extends the full length of the baton 16. The wires 76 are positioned in the groove and are connected to small "rice-grain" bulbs 78 which are distributed evenly along the groove 74. The groove 74 is then filled with a translucent plastic filler 80 and the outer surface of the filler 80 is covered with a dark opaque layer of paint 82. After the paint has dried, elongated regions of the paint are removed in front of each of the bulbs 78 so that the illuminated baton forms a plurality of line-type light sources which more clearly define the attitude of the baton in low light level conditions. The installation of the lights in a groove along the rod and facing the pilot avoids reflections in the windscreen and allows the light from the bulbs to be reflected outwardly from the root of the grooves. It will be understood that the stationary baton 18 is also provided with similar illumination or both batons may be equipped with a radioactive luminescent (beta) light sources which do not require an external power source.

It will be understood from the above specification that the instrument provides a novel horizontal horizon reference coincident with the true horizon in the direct field of view of the pilot through the windscreen. While the instrument is disclosed in the aircraft environment, it may be used in other craft, such as spacecraft, which are manually stabilized. The instrument does not employ sophisticated and expensive projection equipment nor does it interfere with the line of sight through the windscreen under visual flight conditions. The instrument may be located slightly off center from the direct line of sight of the pilot, i.e. a peripheral indication, but nevertheless within the field of view of the pilot through the windscreen. In such a position, the pilot may be guided by the instrument whenever the actual horizon is obscured from sight and will be able to immediately pick up the actual horizon as it comes into view. The pilot at all times has the benefit of his peripheral vision and consequently the transition times between references to the instrument and to the actual horizon are substantially reduced.

While the novel artificial horizon instrument has been disclosed in several embodiments, it is to be understood that various substitutions and modifications can be made without departing from the spirit of the invention. For example, while the specific support mechanism for the shaft 14 is provided by a rotatable yoke, equivalent structure providing both the pivoting and rotating motions can be provided. Furthermore, the drive paths between the two servo motors 36 and 42 may be provided by other mechanisms which produce the translational and rotational motion of the baton 16. The invention, therefore, has been described by way of illustration rather than limitation.

What is claimed is:

1. A head-up attitude display instrument for a manually controlled aircraft having a cockpit and windscreen, said instrument comprising
   an instrument fixture mounted in the cockpit of the aircraft;
   a pivotable and rotatable shaft mounted in said fixture and projecting therefrom in a plane perpendicular to the plane of the fixture and parallel to the longitudinal axis of the aircraft;
   a baton secured to the free end of the shaft at right angles to the centerline of the shaft for forming a horizon reference in the field of view of a pilot looking through the windscreen;
   roll means, responsive to rolling motions of the aircraft and including a signal-producing gyroscopic attitude reference, for controlling rotation of said shaft such that the horizon reference baton is continually coincident at all times with the real horizon and responds in position and movement in accordance with the relative movement of the real horizon with respect to the aircraft;
   pitch means, responsive to pitching motions of the aircraft and including said signal-producing gyroscopic attitude reference, for controlling pivoting of the shaft with respect to the fixture in said parallel plane in response to pitching motions of the aircraft; and
   a second reference representative of the aircraft supported by said fixture in the field of view of a pilot looking through the windscreen and at a position adjacent said baton, said second reference being adjustable to the desired flight attitude or angle of attack;
   said baton including illumination means comprising a plurality of lights distributed along the side of the baton facing away from the windscreen and toward the viewer; and said roll means including a manually adjustable roll trimming means for rotating the shaft with respect to the fixture a preselected amount serially with the gyroscopic attitude reference.

2. The head-up attitude display instrument of claim 1 wherein:
   the pitch means additionally includes a manually adjustable pitch trimming means for pivoting the shaft with respect to the fixture a preselected amount serially with gyroscopic attitude reference.

* * * * *